United States Patent Office 3,280,117
Patented Oct. 18, 1966

3,280,117
TRICYCLIC QUINAZOLINONES
Rudolf G. Griot, Florham Park, N.J., assignor to Sandoz Inc., Hanover, N.J.
No Drawing. Filed Apr. 20, 1964, Ser. No. 361,211
22 Claims. (Cl. 260—243)

This invention provides pharmaceutically active heterotricyclic compounds of the formula

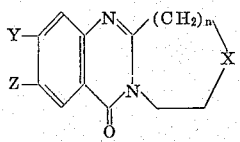

(I)

wherein:

X is either a sulfur atom (=S), an oxygen atom (=O) or =N—R;

R being either a hydrogen atom (—H); lower alkyl, e.g. methyl, ethyl, propyl, isopropyl and butyl; propargyl; butyrophenone [—(CH$_2$)$_3$—CO—C$_6$H$_5$]; or para-substituted butyrophenone wherein the substituent is either a fluorine atom (—F), methoxy (—OCH$_3$) or a chlorine atom (—Cl);

One of Y and Z is either a chlorine atom (—Cl); a bromine atom (—Br); a fluorine atom (—F); trifluoromethyl (—CF$_3$); thio(lower)alkyl [—S—(lower alkyl)], e.g. thiomethyl, thioethyl, thiopropyl, thioisopropyl and thiobutyl; or lower alkoxy, e.g. methoxy, ethoxy, propoxy, isopropoxy and butoxy; whereas the other is a hydrogen atom (—H); and n is one of the numbers 1 and 2.

These compounds fall into two distinct classes: (a) 1,2,4,5-tetrahydro[1.4]azepino[5,4-b]quinazolin - 7(7 - H)-ones, i.e. when n is 2, and (b) azino[3,4-b]quinazolin-6(6-H)-ones, i.e. when n is 1. Said two classes are each further subdivided in view of the nature of X. Class (a) includes tetrahydro oxazepines (X is =O), tetrahydro thiazepines (X is =S) and tetrahydro diazepines (X is =N—R), whereas class (b) includes morpholines (X is =O), thiomorpholines (X is =S) and piperazines (X is =N—R).

Compounds (I) are prepared by refluxing in an inert solvent, e.g. methanol, an anthranilic acid

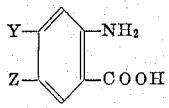

(II)

wherein Y and Z have the above-ascribed meanings, with a (lower)alkoxy-aza-cycloalkene

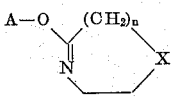

(III)

wherein:

A is lower alkyl, preferably methyl or ethyl,
n has the above-ascribed meaning, and
X has the above-ascribed meaning.

To obtain compounds (I) wherein X is =NH, however, the reaction under reflux is conducted with the corresponding compound (III) wherein X is =N—Cbz, the Cbz denoting carbobenzoxy. The Cbz group is then removed by admixing said corresponding compound (III) with an acetic acid solution of hydrogen bromide and freeing the resulting acid addition salt according to well-known procedures.

To obtain compound (I) wherein X is =N—R and R is other than a hydrogen atom, the corresponding compound wherein X is =NH is first prepared and this compound is reacted according to well-known procedures with R—Hal (IV)

wherein Hal is any halogen, e.g. bromine (—Br), fluorine (—F) and iodine (—I), but preferably chlorine (—Cl).

Compounds (I) and their therapeutically acceptable acid addition salts possess CNS (central nervous system) activity and are useful for this activity. Those compounds (I) wherein X is =O or =S produce marked CNS depression, barbiturate potentiation and slight catalepsy and are useful as sedatives, hypnotics or tranquilizers. Those compounds (I) wherein X is =N—R produces CNS stimulation (the tittle compound of Example 5 is five to ten times more active than that of Example 7) and are useful as general CNS stimulants, such as analeptics and mood elevators.

Compounds (I) may be administered either orally or parenterally. Daily doses vary from 15 milligrams to in excess of 300 milligrams, depending upon the particular compound and the condition being treated. For the title compound of Example 1 typically daily doses range from 200 to 300 milligrams, whereas those for the title compound of Example 5 range from 15 to 20 milligrams and those for the title compound of Example 7 range from 100 to 150 milligrams.

All acid addition salts of compounds (I) are useful as intermediates in the preparation of the corresponding free bases according to standard procedures for freeing bases. Acid addition salts are prepared by neutralizing the free base with an acid. Exemplary pharmacologically acceptable acid addition salts are the hydrochlorides, fumarates, maleinates, tartrates, methane sulfonates, salicylates and hydrosulfates.

The following examples illustrate the invention, the parts and percentages being by weight unless otherwise stated, and the relationship of parts by weight to parts by volume being the same as that of the kilogram to the liter. All temperatures are in degree centigrade.

Example 1.—9-chloro-1,2,4,5-tetrahydro[1,4]oxazepino [5,4-b]quinazolin-7(7-H)-one

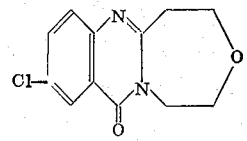

To 4.29 parts of 5-chloroanthranilic acid in 40 parts by volume of methanol add 3.94 parts of 5-ethoxy-1-oxa-4-aza-cycloheptene-Δ$^{4,5}$. Reflux the obtained mixture for 2 hours. Upon cooling a crystalline solid precipitates. Recrystallize the solid from absolute ethanol. The yield of the title compound, melting point (M.P.) 158° to 159.5°, is 3.5 parts.

When the 5-chloroanthranilic acid is replaced by an equivalent of 5-bromoanthranilic acid, 5-fluoroanthranilic acid, of 5-thrifluoromethylanthranilic acid or 5-ethoxyanthranilic acid, the corresponding 9-substituted compound is similarly obtained.

Example 2.—9-chloro-1,2,4,5-tetrahydro[1,4]thiazepino [5,4-b]quinazolin-7(7-H)-one

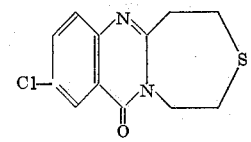

Reflux for two hours a mixture of 4.72 parts 5-chloroanthranilic acid in 40 parts by volume of methanol with 5.0 parts of 5 - ethoxy - 1 - thia-4-aza-cycloheptene-Δ$^{4,6}$.

Evaporate in vacuo the solvent from the obtained product.

Chromatograph 3.5 parts of the residue through a column of 40 parts of silicon dioxide. Elute fractions with 99.5% chloroform at a rate of 18 parts by volume per 5 minutes. Combine identical fractions (as determined by thin layer plates), and evaporate same to dryness to obtain a yield of 1.42 parts.

Dissolve said 1.42 parts in benzene, and place the resulting solution on a column of 60 parts of aluminum oxide ($Al_2O_3$). Elute same with benzene at a rate of 12 parts by volume per 5 minutes. Combine identical fractions (checked by thin layer chromatography), and crystallize from n-propanol. The yield of the title compound, M.P. 155.5° to 156.5°, is 0.5 part.

When the 5-chloroanthranilic acid is replaced by an equivalent of 4-chloroanthranilic acid, 4-trifluoromethylanthranilic acid, 4-butoxyanthranilic acid or 4-thioisopropylanthranilic acid, the corresponding 10-substituted compound is similarly obtained.

*Example 3.—3-carbobenzoxy-9-chloro-1,2,3,4,5,7-hexahydro[1,4]diazepino[5,4-b]quinazolin-7-one*

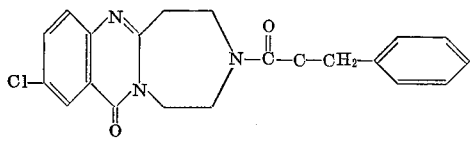

Admix 10 parts of 1-carbobenzoxy-5-ethoxy-1,4-diazacycloheptene-$\Delta^{4,5}$ with a mixture of 6.18 parts of 5-chloroanthranilic acid in 60 parts by volume of methanol. Maintain the resultant at 20° for 3 hours prior to refluxing for 1 hour. After refluxing, evaporate the solvent in vacuo. Recrystallize the residue from methanol/ether to obtain the title compound, M.P. 123° to 124°.

When the 5-chloroanthranilic acid is replaced by an equivalent of 5-thiomethylanthranilic acid, 5-thiobutylanthranilic acid, 5-methoxyanthranilic acid or 5-isopropoxyanthranilic acid, the corresponding 9-substituted compound is similarly obtained.

*Example 4.—9-chloro-1,2,3,4,5,7-hexahydro[1,4] diazepino[5,4-b]quinazolin-7-one*

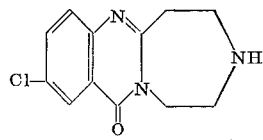

Dissolve 6.0 parts of the title compound of Example 3 in 20 parts by volume of glacial acetic acid. Add to the obtained solution 200 parts by volume of 4 N (in acetic acid) hydrogen bromide. Maintain the resulting admixture over night (17 to 19 hours) at room temperature (20°). The dihydrobromide of the title compound (6.0 parts), M.P. 295° to 296°, thus precipitates and is separated by filtration.

Suspended said dihydrobromide in chloroform. To the obtained suspension add 6.0 parts of ice, and saturate the produce with solid potassium carbonate ($K_2CO_3$). Exaporate the resulting chloroform solution to dryness. Recrystallize the title compound, M.P. 155° to 156°, from cyclohexane.

The process illustrated by this example, as well as that illustrated by Example 5, applies equally as well irrespective of the particular X or Y within the meanings contemplated by this invention.

*Example 5.—9-chloro-3-methyl-1,2,3,4,5,7-hexahydro [1,4]diazepino[5,4-b]quinazolin-7-one*

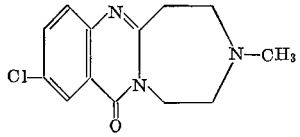

Methylate 3.8 parts of the title compound of Example 4 by the Eschweiler-Clarke procedure ["Journal of the American Chemical Society," 55, 4571 (1933)], using 12 parts of 90% formic acid and 8 parts of 36% (aq.) formaldehyde.

Place the product thus obtained on a column of alumina ($AL_2O_3$), and elute with 1:1 chloroform/benzene. Evaporate to dryness the third fraction of 250 parts by volume. The title compound (1.92 parts), M.P. 132° to 133°, is thus obtained.

Dissolve said title compound in 10 parts by volume of methanol. To the obtained solution add a solution of 1.68 parts of maleinic acid in 15 parts by volume of methanol. Cool to room temperature, whereby the maleinic (2.4 parts), M.P. 198° to 199.5° (hydroscopic), precipitates.

This procedure for obtaining the maleinate is a general one for obtaining acid addition salts of compound (I). When the maleic acid is replaced by an equivalent of hydrochloric acid, fumaric acid, tartaric acid, methane sulfonic acid or salicylic acid, the corresponding acid addition salt is produced.

*Example 6.—2-carbobenzoxy-8-chloropiperazino[3,4-b] quinazolin-6(6-H)-one*

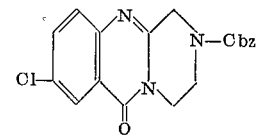

Add 7.6 parts of 1-carbobenzoxy-5-ethoxy-1,4-diazacyclohexene-$\Delta^{4,5}$ and 50 parts by volume of para-toluenesulfonic acid to a solution of 5.12 parts of 5-chloroanthranilic acid in 50 parts by volume of methanol Reflux the obtained mixture for 1 hour. Thereafter evaporate the solvent in vacuo.

Dissolve the resulting residue in chloroform. Extract the obtained chloroform solution with 2 N sodium carbonate ($Na_2CO_3$). Separate the organic phase. Dry. Evaporate. Recrystallize the obtained residue from acetone-diethylether to obtain the title compound, M.P. 158° to 159°.

When the 5-chloroanthranilic acid is replaced by an equivalent of 4-bromoanthranilic acid, 4-fluoroanthranilic acid, 4-thioethylanthranilic acid, 4-thiopropylanthranilic acid or 4-propoxyanthranilic acid, the corresponding 9-substituted compound is similarly obtained. Any of these corresponding compounds, used as starting material for Examples 7 and 8, results in the corresponding final product.

When the 1 - carbobenzoxy - 5 - ethoxy - 1,4 - diazacyclohexene-$\Delta^{4,5}$ is replaced by an equivalent of 5-ethoxy-1-oxa-4-azacyclohexene-$\Delta^{4,5}$ or of 5-ethoxy-1-thia-4-azacyclohexene-$\Delta^{4,5}$, the corresponding compound (I) is obtained wherein X is =O or =S, respectively, rather than =N—Cbz.

*Example 7.—8-chloropiperazino[3,4-b]quinazolin-6(6-H)-one*

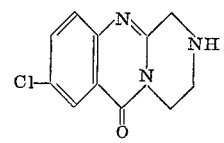

Dissolve 10 parts of the title compound of Example 6 in 100 parts by volume of acetic acid. To the obtained solution add a 4 N solution (in acetic acid) of hydrogen bromide. Maintain the resultant at room temperature over night.

Suspend the resulting dihydrobromide of the title compound in chloroform. Add to the formed suspension sufficient ice water to dissolve the dihydrobromide. Saturate the obtained aqueous phase with $K_2CO_4$, and separate the layers. Evaporate the chloroform to obtain 3.5 parts of the free base (title compound), M.P. 168°.

This is a general procedure for freeing a base (according to this invention) from its acid addition salt.

*Example 8.—8-chloro-2-methylpiperazino[3,4-b]quinozolin-6(6-H)-one*

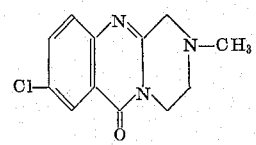

To 250 parts of 8-chloropiperazino [3,4-b]quinozolin-6(6-H)-one in 10 parts by volume of methanol, add dropwise 135 parts of dimethylsulfate in 5 parts by volume of methanol. Maintain the reaction temperature between 25° to 30° for one hour. Thereafter evaporate the resulting mixture to dryness. Dissolve the residue in water (made alkaline with $K_2CO_3$ solution). Extract the resultant with chloroform. Submit the chloroform extract to column chromatography. Crystallize the thus-purified product which melts at 103° to 104° after recrystallization from cyclohexane.

What is claimed is:

1. A compound which, in its free base form, has the formula

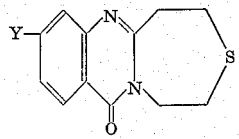

wherein:
Y is a member selected from the group consisting of a chlorine atom, a bromine atom, a fluorine atom, trifluoromethyl, thio(lower)alkyl and lower alkoxy.

2. A compound which, in its free base form, has the formula

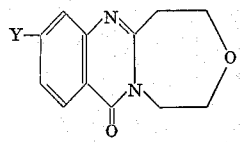

wherein:
Y is a member selected from the group consisting of a chlorine atom, a bromine atom, a fluorine atom, trifluoromethyl, thio(lower)alkyl and lower alkoxy.

3. A compound which, in its free base form, has the formula

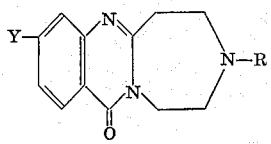

wherein:
Y is a member selected from the group consisting of a chlorine atom, a bromine atom, a fluorine atom, trifluoromethyl, thio(lower)alkyl and lower alkoxy; and
R is a member selected from the group consisting of a hydrogen atom, lower alkyl, propargyl, butyrophenone and butyrophenone para-substituted by a member selected from the group consisting of a fluorine atom, methoxy and a chlorine atom.

4. A compound which, in its free base form, has the formula

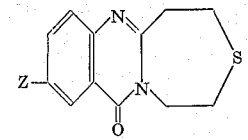

wherein:
Z is a member selected from the group consisting of a chlorine atom, a bromine atom, a fluorine atom, trifluoromethyl, thio(lower)alkyl and lower alkoxy.

5. 9-chloro-1,2,4,5 - tetrahydro[1,4]thiazepinol[5,4-b]quinazolin-7(7-H)-one.

6. A compound which, in its free base form, has the formula

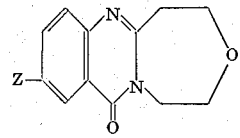

wherein:
Z is a member selected from the group consisting of a chlorine atom, a bromine atom, a fluorine atom, trifluoromethyl, thio(lower)alkyl and lower alkoxy.

7. 9-chloro-1,2,4,5-tetrahydro[1,4]oxazepino[5,4-b]quinazolin-7(7-H)-one.

8. A compound which, in its free base form, has the formula

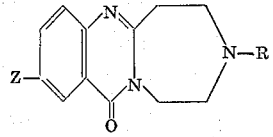

wherein:
Z is a member selected from the group consisting of a chlorine atom, a bromine atom, a fluorine atom, trifluoromethyl, thio(lower)alkyl and lower alkoxy; and
R is a member selected from the group consisting of a hydrogen atom, lower alkyl, propargyl, butyrophenone and butyrophenone para-substituted by a member selected from the group consisting of a fluorine atom, methoxy and a chlorine atom.

9. 9-chloro-1,2,3,4,5,7-hexahydro[1,4]diazepino[5,4-b]quinazolin-7-one.

10. 9-chloro-3-methyl-1,2,3,4,5,7-hexahydro[1,4]diazepino[5,4-b]quinazolin-7-one.

11. A compound which, in its free base form, has the formula

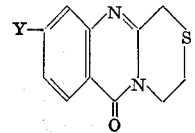

wherein:
Y is a member selected from the group consisting of a chlorine atom, a bromine atom, a fluorine atom, trifluoromethyl, thio(lower)alkyl and lower alkoxy.

12. A compound which, in its free base form, has the formula

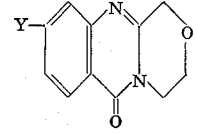

wherein:
Y is a member selected from the group consisting of a chlorine atom, a bromine atom, a fluorine atom, trifluoromethyl, thio(lower)alkyl and lower alkoxy.

13. A compound which, in its free base form, has the formula

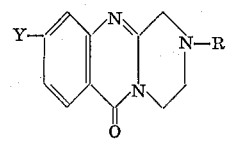

wherein:
Y is a member selected from the group consisting of a chlorine atom, a bromine atom, a fluorine atom, trifluoromethyl, thio(lower)alkyl and lower alkoxy; and
R is a member selected from the group consisting of a hydrogen atom, lower alkyl, propargyl, butyrophenone and butyrophenone para-substitiuted by a member selected from the group consisting of a fluorine atom, methoxy and a chlorine atom.

14. A compound which, in its free base form, has the formula

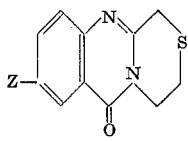

wherein:
Z is a member selected from the group consisting of a chlorine atom, a bromine atom, a fluorine atom, trifluoromethyl, thio(lower)alkyl and lower alkoxy.

15. A compound which, in its free base form, has the formula

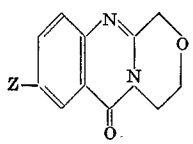

wherein:
Z is a member selected from the group consisting of a chlorine atom, a bromine atom, a fluorine atom, trifluoromethyl, thio(lower)alkyl and lower alkoxy.

16. A compound which, in its free base form, has the formula

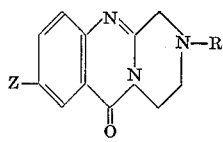

wherein:
Z is a member selected from the group consisting of a chlorine atom, a bromine atom, a fluorine atom, trifluoromethyl, thio(lower)alkyl and lower alkoxy; and
R is a member selected from the group consisting of a hydrogen atom, lower alkyl, propargyl, butyrophenone and butyrophenone para-substituted by a member selected from the group consisting of a fluorine atom, methoxy and a chlorine atom.

17. 8-chloropiperazino[3,4-b]quinazolin-6(6-H)-one.
18. 2-methyl-7-chloro-2-piperazino[4,5-b]quinazolino-6(3-H)-one.
19. A compound which, in its free base form, is monosubstituted 3-carbobenzoxy-1,2,4,5-tetrahydro[1,4]diazepino[5,4-b]quinazolin-7(7-H)-one, the substituent being in one of the positions 9 and 10 and being a member selected from the group consisting of a chlorine atom, a bromine atom, a fluorine atom, trifluoromethyl, thio(lower)alkyl and lower alkoxy.
20. 3-carbobenzoxy-9-chloro - 1,2,3,4,5,7 - hexahydro [1,4]diazepino[5,4-b]quinazolin-7-one.
21. A compound which, in its free base form, is monosubstituted 2-carbobenzoxypiperazino[3,4-b]quinazolin-6(6-H)one, the substituent being in one of the positions 8 and 9 and being a member selected from the group consisting of a chlorine atom, a bromine atom, a fluorine atom, trifluoromethyl, thio(lower)alkyl and lower alkoxy.
22. 2-carbobenzoxy-8-chloropiperazino[3,4-b]quinazolin-6(6-H)-one.

References Cited by the Examiner
UNITED STATES PATENTS
3,150,136  9/1964  Wolfram et al. _____ 260—256.4

OTHER REFERENCES
Beyer et al.: Chemische Berechte, vol. 97, p. 390 (February 1964).

WALTER A. MODANCE, Primary Examiner.
JOHN M. FORD, Assistant Examiner.